(12) United States Patent
Friedlander et al.

(10) Patent No.: US 8,787,996 B2
(45) Date of Patent: Jul. 22, 2014

(54) METHOD AND A SYSTEM FOR CONTROLLING AND TRACKING RADIATION EMITTED FROM MOBILE PHONES

(71) Applicant: tawkon Ltd., Ramat HaSharon (IL)

(72) Inventors: Gil Friedlander, Ramat HaSharon (IL); Amit Lubovsky, Rishpon (IL)

(73) Assignee: Tawkon Ltd., Ramat Hasharon (IL)

( * ) Notice: Subject to any disclaimer, the term of this patent is extended or adjusted under 35 U.S.C. 154(b) by 0 days.

(21) Appl. No.: 13/795,029

(22) Filed: Mar. 12, 2013

(65) Prior Publication Data

US 2013/0196723 A1    Aug. 1, 2013

Related U.S. Application Data

(63) Continuation of application No. 12/685,158, filed on Jan. 11, 2010, now abandoned.

(60) Provisional application No. 61/150,802, filed on Feb. 9, 2009.

(51) Int. Cl.
*H04M 1/00* (2006.01)

(52) U.S. Cl.
USPC ............... 455/575.5; 455/575.7; 455/556.1; 455/550.1; 455/425; 455/423

(58) Field of Classification Search
USPC ............ 455/575.5, 575.7, 556.1, 550.1, 423, 455/425
See application file for complete search history.

(56) References Cited

U.S. PATENT DOCUMENTS

| | | | |
|---|---|---|---|
| 6,018,646 A * | 1/2000 | Myllymaki et al. | 455/115.4 |
| 2002/0011828 A1* | 1/2002 | Wallach | 324/76.15 |
| 2005/0090299 A1* | 4/2005 | Tsao et al. | 455/575.5 |
| 2005/0101315 A1* | 5/2005 | Yamaguchi et al. | 455/423 |
| 2005/0159195 A1* | 7/2005 | Huber et al. | 455/575.5 |
| 2006/0019668 A1* | 1/2006 | Kraiem et al. | 455/446 |
| 2008/0159547 A1* | 7/2008 | Schuler et al. | 381/56 |
| 2008/0261584 A1* | 10/2008 | Qi et al. | 455/423 |
| 2010/0056210 A1* | 3/2010 | Bychkov et al. | 455/556.1 |

* cited by examiner

*Primary Examiner* — Kwasi Karikari
(74) *Attorney, Agent, or Firm* — Mintz Levin Cohn Ferris Glovsky and Popeo, P.C.

(57) ABSTRACT

A mobile handset configured to estimate the radiation absorbed per mass of tissue of a user, and to perform an action in case the absorbed radiation exceeds a predefined threshold. The absorbed radiation may be estimated during a call. Additionally or alternatively, a prediction of the absorbed radiation level may be estimated and given to the user while the handset is not engaged in a call. various data items such as received power per time, estimated absorbed radiation and location may be transmitted to a server. A server application may use these data items to create regional maps of a cellular network coverage and quality by accumulating multiple inputs from a plurality of individual mobile handsets.

3 Claims, 4 Drawing Sheets

METHOD AND A SYSTEM FOR CONTROLLING AND TRACKING RADIATION EMITTED FROM MOBILE PHONES

CROSS REFERENCE TO RELATED APPLICATIONS

This application is a continuation application of U.S. patent application Ser. No. 12/685,158, filed Jan. 11, 2010, which claims the benefit of U.S. Provisional Application No. 61/150,802, filed on Feb. 9, 2009, and entitled Method and system for controlling and tracking radiation emitted from mobile phones, the contents of each are incorporated in their entirety herein by reference.

BACKGROUND OF THE INVENTION

Cellular communication is based on transmission of RF signals between mobile phones or handsets and a cellular base station. The user of the mobile phone is exposed to non ionizing radiation emitted from the mobile phone. Radiation is known to decease as a factor of square of the distance from the radiation source.

During recent years increasing scientific evidence has indicated that long term exposure to non-ionizing radiation may cause potential damage to human tissues.

The emitted radiation, which is the power transmitted from the mobile phone to the base station is not constant over time and is being adjusted constantly due to environmental conditions such as distance, obstructions surrounding buildings and terrain. The absorbed radiation, which is the amount of radiation absorbed by the human tissue, may be a function of the emitted radiation, the distance between the handset and the tissue the specific physiology of the user and other parameters.

The rate of radiation absorption per mass of tissue, often referred to as Specific Absorption Rate (SAR) may be a factor of the emitted handset radiation, the distance between the mobile handset and the user, the physiology of the user and other parameters. Specifications of the maximum allowed SAR for a specific handset are found in, for example, the Federal Communication Commission, Evaluating compliance with FCC guidelines for human exposure to radiofrequency electromagnetic fields, Supplement C (edition 01-01) to OET bulletin 65 (edition 97-01), FCC, 2001.

SUMMARY OF THE INVENTION

According to some embodiments of the invention, there is provided a mobile handset comprising a RF unit to transmit and receive RF signals, and a core logic unit comprising at least one radiation estimation unit to provide an estimation of absorbed radiation in a user, and an action generation unit configured to perform an action in case said estimation absorbed radiation exceeds a threshold.

According to some embodiments of the invention, there is provided a method for tracking absorbed radiation from mobile handsets, the method comprising estimating absorbed radiation to receive an estimation of said absorbed radiation and performing an action in case said estimation of said absorbed radiation exceeds a threshold.

According to embodiments of the invention said absorbed radiation is selectable from a list comprising: absorbed radiation rate per mass of tissue during a call, the amount of absorbed radiation per mass of tissue during a call, the amount of absorbed radiation per mass of tissue over time intervals, potential absorbed radiation rate during a call per mass of tissue and prediction of absorbed radiation rate per mass of tissue while the mobile handset is not engaged in a call.

According to embodiments of the invention said action is selectable from a list comprising: alert the user, disconnect said call, direct said call to a wired headset, direct said call to a wireless headset, direct said call to a speaker, inform exceeding of absorbed radiation to a user of a peer mobile handset, inform exceeding of radiation to a user of a monitoring mobile handset, give at least one recommendation to the user, and generate a radiation report.

According to embodiments of the invention said absorbed radiation is estimated by simulating real-life scenarios, recording a set of handset parameters levels to receive recorded handset parameters, measuring absorbed radiation to receive measured absorbed radiation, recording said measured absorbed radiation, and fitting an empirical formula relating said measured absorbed radiation to said set of recorded handset parameters in the laboratory, and uploading said empirical formula to said mobile handset, retrieving current levels of said set of handset parameters, and substituting said current levels of said set of handset parameters in said empirical formula to receive said estimation of absorbed radiation.

According to some embodiments of the invention, there is provided a cellular communication system comprising a cellular network and at least one mobile handset in active communication with said cellular network said mobile handset capable of estimating absorbed radiation in a user and capable of generating a radiation report.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
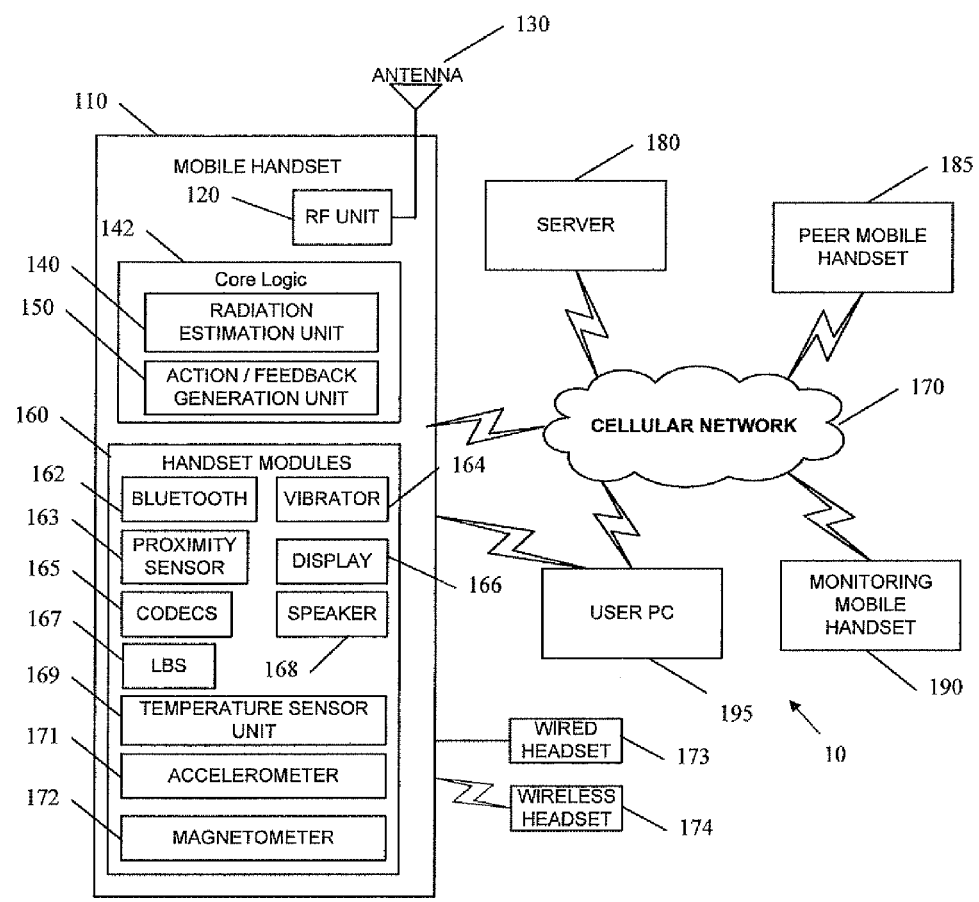
FIG. 1 is a schematic illustration of a general architecture of a system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "plurality" may be used throughout the specification to describe two or more components, devices, elements, parameters and the like.

According to embodiments of the invention, the radiation absorbed per mass of tissue of a user (hereafter "absorbed radiation") is estimated. The absorbed radiation may be presented to the user on the handset, to a user of peer handset which is a handset with which the conversation is being held, or to a user of a monitoring handset which is a handset defined and configured to supervise mobile handset. The absorbed radiation data may be sent over the cellular network and a communication network such as the internet to a server or a personal computer (PC). In addition, a user may be given various recommendations aiming at decreasing the amount of the absorbed radiation. Various actions may be taken if the absorbed radiation exceeds a predefined threshold. For example, the conversation may be disconnected, an alarm may be activated, a massage may be sent to a peer or a monitoring handset, or other suitable actions may be taken. Statistics of the absorbed radiation and potential absorbed radiation over time may be presented to the user on his hand set, on a user personal computer (PC) and the like.

According to embodiments of the invention, decreasing the absorbed radiation may be achieved by decreasing the emitted radiation or by increasing the distance between the mobile handset and the user or both.

According to embodiments of the invention, the absorbed radiation may be estimated during a call. Additionally or alternatively, a prediction of the absorbed radiation level (hereinafter "predicted absorbed radiation") may be estimated and given to the user while the handset is not engaged in a call. The predicted absorbed radiation is an estimation of the radiation that would have been absorbed by the user, had the user been engaged in a call in the time the prediction is being made. According to embodiments of the invention, given an estimation of the mass of the user head, it is possible to calculate the radiation absorption for the head, by multiplying SAR the estimated mass of the head.

According to embodiments of the invention, the value of the absorbed radiation may be estimated and presented to the user together with an estimation of the potential absorbed radiation. The potential absorbed radiation is the level of radiation that would have been absorbed by the user, if the user was holding the handset close to his head or body while in a call. Moving the mobile handset away from the head and body of the user may result in a significant decease in the absorbed radiation levels. In this case the potential absorbed radiation may be higher than the absorbed radiation level. Presenting to the user the potential absorbed radiation together with the absorbed radiation, or the differences between the potential absorbed radiation and the absorbed radiation, may give the user an estimation of the decrease in the amount of absorbed radiation caused solely by removing the mobile handset away from his head or body.

According to embodiments of the invention, the estimated amount of absorbed radiation may be presented. For example, the amount of absorbed radiation for a specific call may be presented to the user. SAR may be estimated and presented. SAR may be presented over different time units such as seconds, minutes, hours, days, months etc.

Reference is now made to FIG. 1 which is a schematic illustration of a general architecture of a system 10 according to embodiments of the invention. According to embodiments of the invention, mobile handset 110 may be in active communication with cellular network 170 and may comprise a radio frequency (RF) unit 120 and an antenna 130 for the reception and transmission of RF signals, a core logic unit 142 comprising of a radiation estimation unit 140, and action generation unit 150, and handset extra modules unit 160 comprising functionality units such as Bluetooth unit 162, proximity sensor 163, vibrator 164, encoders/decoders (CODECS) unit 165, display 166, location based services (LBS) unit 167, speaker 168, temperature sensor unit (169), accelerometer (171), and magnetometer (172). A wired headset 173 may be connected to handset 110, or alternatively, handset 110 may be in active communication with a wireless headset 174. For example, handset 110 may be in active communication with a wireless headset 174 using Bluetooth protocol utilizing Bluetooth unit 162. Core Logic unit 142 may communicate over one or more communication mediums such as cellular network 170 or the Internet (not shown) with various entities such as one or more servers 180 connected to said handset via a network, such as cellular network 170 or the internet (not shown), a peer mobile handset 185, which is a handset with which a conversation is being held, a monitoring mobile handset 190 which is a handset defined and configured to supervise mobile handset 110, and a user PC 195. According to embodiments of the invention, core logic unit 142 may communicate with these entities additionally or alternatively using other means of communication. For example, core logic unit 142 may communicate with user PC 195 using one or more protocols for exchanging data over short distances, such as Bluetooth wireless communication (not shown), a Universal Serial Bus (USB) (not shown) cable and the like.

According to embodiments of the invention, radiation estimation unit 140 may estimate the absorbed radiation. Action generation unit 150 may receive absorbed radiation estimations from radiation estimation unit 140. Action generation unit 150 may be pre-configured or configured by a user of mobile handset 110 locally through input and output means of mobile handset 110 or remotely through user PC 195, via monitoring handset 190, or via server on the internet 180, for example, via a service provider server on the internet (not shown). User PC 195 can be used for modifying configurations of mobile handset 110 via a server or directly to a single or multiple handsets. Action generation unit 150 may initiate one or more of various actions based on the absorbed radiation estimations and on the action generation unit 150 configuration.

According to embodiments of the invention, radiation estimation unit 140 may estimate the SAR, the total amount of absorbed radiation during calls or over time. These estimations may relate to the actual absorbed radiation by the user. Additionally, radiation estimation unit 140 may estimate the potential absorbed radiation. In addition, radiation estimation unit 140 may give a prediction of the absorbed radiation while the handset is not engaged in a call.

It will be noted that although a communication session enabling two or more humans or other entities (e.g., a human caller and a server) to communicate over a cellular network will typically be referred to hereinafter as a call, the term "call" should be expansively and broadly construed to include any applicable session or interaction carried over a cellular network. A call may be a telephony session, an instant massaging session, a video session, a chat session, a web browsing session or any other applicable type of multi-media interaction.

According to embodiments of the invention, action generation unit 150 may be configured to perform one or more of the actions listed below upon, or in response to the occurrence of one or more of the following events: when absorbed radiation exceeds a predefined threshold momentarily or over a predefined time duration, or if the accumulated absorbed radiation estimation reaches a predefined threshold:

Alert the user. The user may be alerted by an audio indication, a visual indication, by vibration of the handset (using vibrator 164) and the like, or any combination thereof.

Disconnect a call to prevent undesired exposure to RF radiation. It is possible, however, that certain calls would not be disconnected if the peer mobile handset 185 is included in a predefined priority list.

Direct a call to a wired headset 173 or wireless headset 174 if available, or else to speaker 168.

Inform the event to the user of peer mobile handset 185. The user of peer mobile handset 185 may be informed by a massage such as text massage using Short Message Service (SMS), an audio indication, a visual indication, by vibration of the handset and the like, or any combination thereof, as may be applicable.

Inform the event to the user of monitoring mobile handset 190. The user of monitoring mobile handset 190 may be informed by a text massage (SMS), an audio indication, a visual indication, by vibration of the handset and the like, or any combination thereof, as may be applicable.

Give various recommendations to the user aiming at decreasing the amount of the absorbed radiation. These recommendations may be given as visual and/or audio indications.

According to embodiments of the invention a recommendation given to the user may include for example, a guidance indicator to direct the user towards a cellular base-station the user communicates with, in order to decrease the distance or align to a line of sight between the user and the cellular base-station. As the radiation level decrease with the square of the distance from the radiating source, getting closer to the base-station may increase the received power proportional to the square of the distance, under various conditions, for example, in case there exists a line of sight between the handset and the base station. As the received power increases, the output emitted radiation of the handset decreases. Therefore, it is expected that getting nearer to the base-station in case there is a line of sight between the handset and the base station may result in decrease of handset 110 emitted radiation and, therefore, in a decrease in the absorbed radiation.

Another recommendation may be, for example, to move to a better location where the mobile handset will radiate less power, or move to a previous location where the mobile handset radiated less, both may result in less absorbed radiation to the user. According to embodiments of the invention action generation unit 150 may keep a record of estimated absorbed radiation values and their respective coordinates in various locations. Getting the location coordinates of handset 110 may be achieved by using, for example, LBS unit 167. Action generation unit 150 may base the recommendation to move to a previous location where the mobile handset radiated less on this record of estimated absorbed radiation values and their respective location coordinates. The user may be directed to a previous location where the mobile handset radiated less using the readings of magnetometer 172.

Another recommendation may be, for example, "switch to vertical phone posture" or "switch to horizontal phone posture". Action generation unit 150 may get readings from an accelerometer of the handset, if available, and determine the posture of the handset based on these readings. Switching to an alternate phone posture may reduce emitted radiation, and therefore, absorbed radiation, since in many handsets the antenna is designed to have best reception and transmission characteristics in a specific position. If any of wired 173 or wireless headset 174, is available, a recommendation to switch to wired 173 or wireless headset 174 may be given. Switching to wired 173 or wireless headset 174 and moving the mobile handset away from the user's head and body may decrease absorbed radiation levels. Additional recommendations may be, for example, use loudspeaker.

According to embodiments of the invention, action generation unit 150 may compare and present to the user values of estimated or predicted absorbed radiation levels, while handset 110 communicates through several cellular networks of various service providers. In case the user may choose among various service providers, the user may consider the absorbed radiation levels while making his choice. Action generation unit 150 may recommend the user of the service provider with which the lowest emitted radiation and hence the lowest absorbed radiation levels were achieved.

According to embodiments of the invention a radiation report summarizing absorbed radiation values may be given to the user of handset 110, the user of monitoring mobile handset 190, or to any other predefined party. The report may include tables, graphs or other forms of data representation that may indicate momentarily absorbed radiation levels, such as peak absorbed radiation levels and the like, accumulated absorbed radiation levels over various time intervals such as day, week, month and the like.

Figure 2:
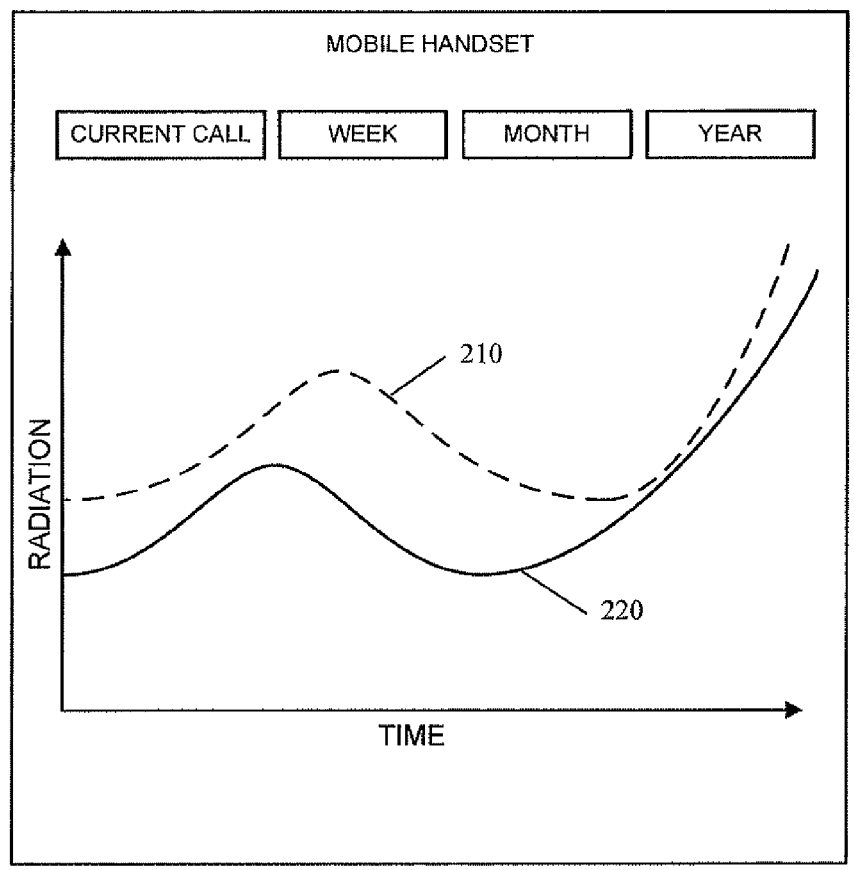
FIG. 2 is a schematic illustration of a graphical representation of estimated absorbed radiation and estimated potential absorbed radiation according to embodiments of the invention.

Reference is now made to FIG. 2 which is a schematic illustration of a graphical representation of estimated potential absorbed radiation 210 and estimated absorbed radiation level 220 according to embodiments of the invention.

According to embodiments of the invention various data items may be transmitted to server 180, for example to a service provider server on the web. These data items may include, for example but not limited to, received power per time, estimated absorbed radiation, peripherals used by the user (e.g. wireless headset 174, wired headset 173, and speaker 168) and location. These data items may be used by different entities for various purposes. For example, the service provider may use this accumulated data from handset users for different purposes, such as improvements/optimization of the network coverage, etc. Network coverage refers to the geographical region within which the handset can reliably receive and transmit signals to and from the network.

According to embodiments of the invention, a server application may use these data items to create regional maps of cellular network coverage and quality by accumulating multiple inputs from a plurality of individual mobile handsets. The regional maps may be presented to the user on the mobile handset, or on the server 180. The regional maps may include, for example but not limited to, the following data: absorbed radiation estimation per location, received power per location, and accessories (wireless headset 174, wired headset 173, and speaker 168 etc.) used by different users per location.

Figure 3:
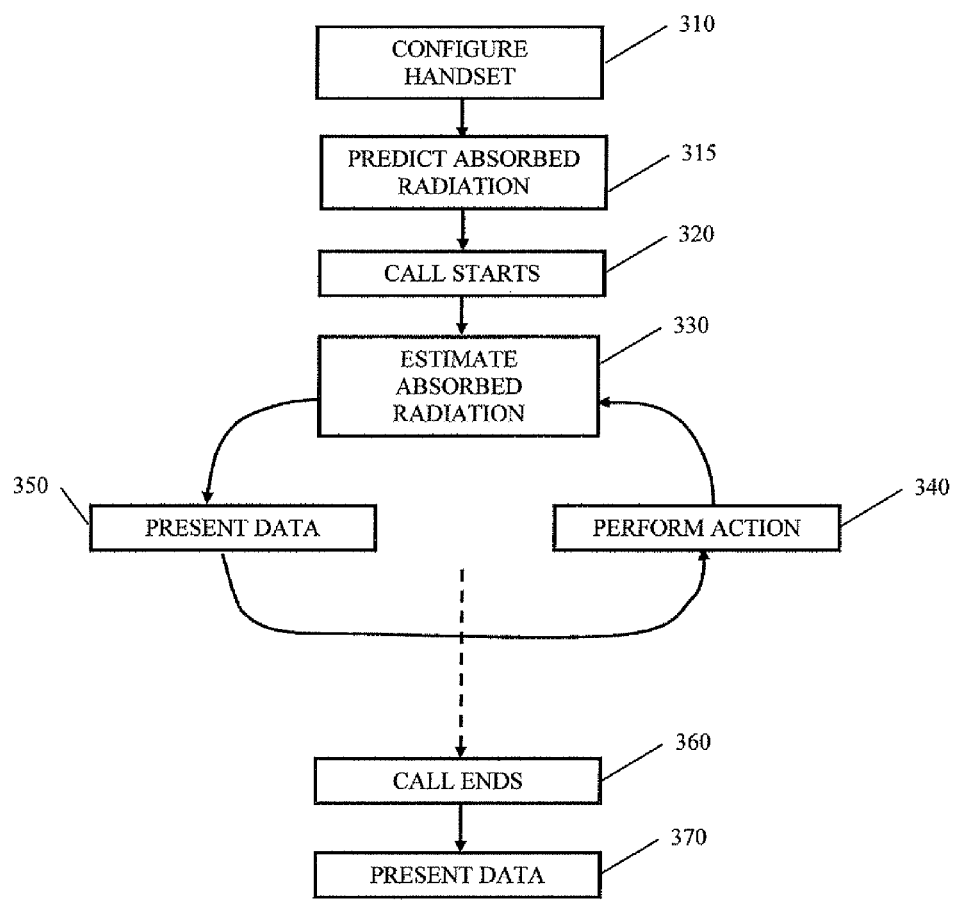
FIG. 3 is a schematic flowchart illustration of a method of controlling and tracking absorbed radiation from mobile handsets according to embodiments of the invention.

Reference is now made to FIG. 3 which presents a schematic flowchart illustration of a method of controlling and tracking absorbed radiation from mobile handsets according to embodiments of the invention. According to embodiments of the invention, a handset may be first configured (block 310) to present absorbed radiation estimations and to perform actions as desired by the user. While not engaged in a call, prediction of absorbed radiation may be presented to the user (block 315). The Prediction of absorbed radiation may be presented continuously, or per the user request. After a call starts (block 320), absorbed radiation may be estimated (block 330). Estimated data may be presented to the user (block 350) during the call and action may be performed (block 340) according to absorbed radiation levels and according to the handset configuration. The levels of absorbed radiation may change following the action generated at block 340. For example the absorbed radiation may change if the conversation is disconnected, if the user moves to a different location, if the user begins to speak with a wired or wireless headset and moves the handset away from his head etc. Therefore, the process of estimating absorbed radiation (block 330), presenting data (block 350) and performing action (block 340) may be repeated as needed, continuously or intermittently providing feedback to the user. In case the user moves the handset away from his head the value of the potential absorbed radiation may be estimated and presented as well. After the call ends (block 360), a summary of absorbed radiation estimations and potential absorbed radiation may be presented to the user (block 370) according to the handset configuration.

Figure 4:
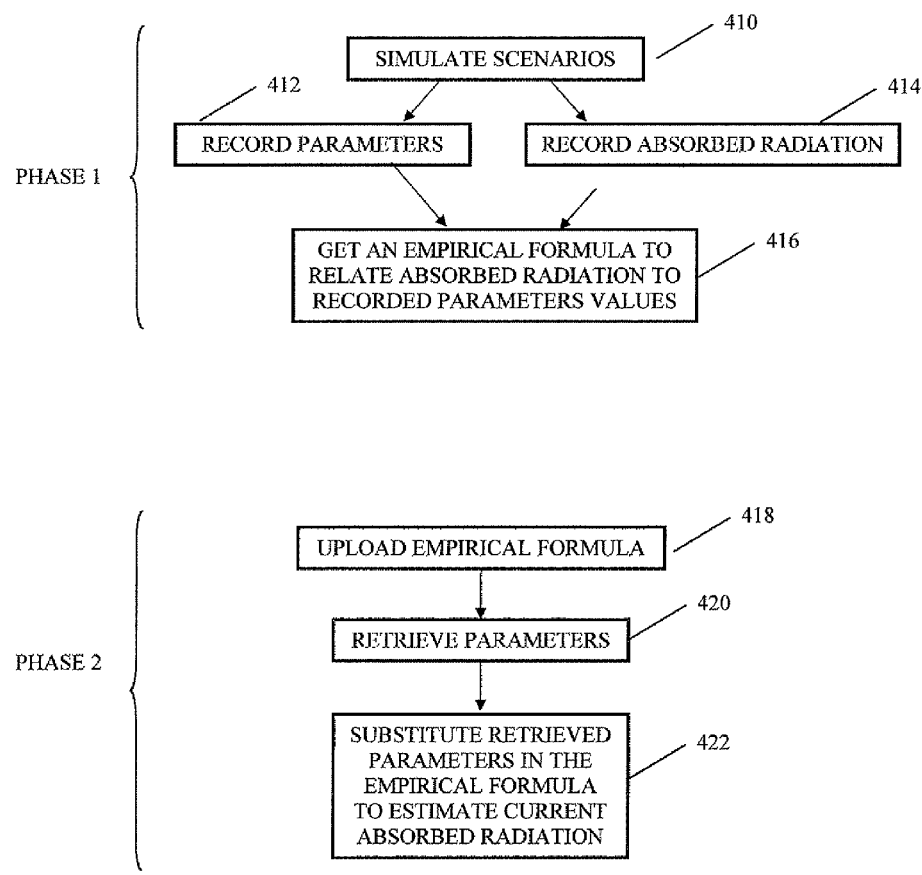
FIG. 4 is a schematic flowchart illustration of a method of estimation of absorbed radiation according to embodiments of the invention.

Reference is now made to FIG. 4 which present schematic flowchart illustration of method of estimation of absorbed radiation according to embodiments of the invention. According to embodiments of the invention, estimation of absorbed radiation levels may be divided into two phases, as presented in FIG. 4. Phase 1 may be a preliminary phase performed in the laboratory, preferably for each of the handset models for which radiation estimation is intended to be done. In phase 1 various real-life scenarios may be simulated (block 410) using specialized equipment as known in the art. The simulated testing real-life scenarios may include using the handset in urban areas, in rural areas, while moving in different speeds, including effects of multipath and fading as well as other testing scenarios. During simulation, absorbed radiation is measured and may further be recorded (block 414) together with various handset parameters (block 412), as will be explained in more details below. The measured absorbed radiation recordings may be time synchronized with the handset parameters recordings. Then, an empirical formula associating the measured absorbed radiation with the recorded handset parameters may be fitted (block 416). The empirical formula may be a combination of logarithms, polynomials and other mathematical expressions, taking into consideration the different cellular technologies of, for example, the second (2G), third (3G) or other generations, that may minimize the prediction error of absorbed radiation or get it below a desired threshold. The empirical formula of block 416 may be used for estimating absorbed radiation while the handset is engaged in a call.

The absorbed radiation and SAR measurements setup used for estimation of absorbed radiation according to embodiments of the invention is known in the art and described, for example, in IEEE 1528, "Recommended Practice for Determining the Peak Spatial-Average Specific Absorption Rate (SAR) in the Human Head from Wireless Communications Devices: Measurement Techniques" or in Supplement C (Edition 01-01) to OET Bulletin 65 (Edition 97-01), "Additional Information for Evaluating Compliance of Mobile and Portable Devices with FCC Limits for Human Exposure to Radiofrequency Emissions" (June 2001).

According to embodiments of the invention, a combination of the following handset parameters may be used for the estimation of the absorbed radiation: received signal code power (RSCP), energy per chip/noise EC/10, Downlink Frequency, Uplink Frequency, Max Transmit Power, Transmit Power, received signal strength indication (RSSI), Band, absolute radio frequency channel number (ARFCN), C1, C2, Cell ID, discontinuous reception (DRX) and discontinuous Transmission (DTX), received signal (Rx) quality, serving and neighbor cell information. According to embodiments of the invention, a subgroup of these parameters may be recorded. Additionally or alternatively, other suitable parameters may be recorded and used Additional parameters that may be used are the readings of the accelerometer, magnetometer, the battery charging status and temperature sensor of the handset, if available. The reading of the temperature sensor may indicate the temperature of the battery of the handset. The temperature of the battery of the handset or the battery charging status may correlate with the transmission power. The readings from the proximity sensor of the handset may be used to determine whether the handset is close to or far from the user, which may have an impact on the absorbed radiation estimation. Additionally, the potential absorbed radiation may be the outcome of the formula of block 416 of FIG. 4, assuming that the reading from the proximity sensor of the handset indicates that the handset is in close proximity to the user's head.

According to embodiments of the invention, in phase 2, the empirical formula, generated for the handset model, is uploaded to a specific handset (block 418), the relevant parameters are retrieved (block 420) and substituted in the empirical formula to get an estimation of current absorbed radiation (block 422). The method described in phase 2 of FIG. 4 may be preformed while the handset is engaged in a call to receive estimation of absorbed radiation. Alternatively, the method described in phase 2 of FIG. 4 may be preformed while the handset is not engaged in a call for predicting absorbed radiation.

It will be appreciated that other methods for getting emitted power and absorbed radiation values are possible. For example, emitted radiation may be directly measured using dedicated hardware, and a formula relating emitted radiation to absorbed radiation may be generated.

Some embodiments of the present invention may be implemented in software for execution by a processor-based handset, for example, core logic unit 142. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the invention may comprise dedicated, custom, custom made or off the shelf hardware, firmware or a combination thereof.

Embodiments of the present invention may be realized by a handset that may include components such as, but not limited to, a plurality of central processing units (CPU) or any other suitable multi-purpose or specific processors or controllers, a plurality of input units, a plurality of output units, a plurality of memory units, and a plurality of storage units. Such handset may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A cellular communication system comprising:
   a cellular network ;
   at least one mobile handset in active communication with said cellular network, said mobile handset capable of estimating radiation exposure in a user, generating a radiation report, and automatically prompting the user to perform an action, upon the estimation of radiation exposure exceeding a selected amount the action selected from at least one of: direct the call to a wired or wireless headset, direct the call to a speaker, move the mobile handset a distance from the user, disconnect the call, change orientation of the mobile device with respect to the user, provide a guidance indicator to direct the user to orient the mobile handset towards a cellular base-station the user communicates with, move to a location where the mobile handset will radiate less power, switch to vertical phone posture, switch to horizontal phone posture, use a loudspeaker, and move to the previous or a different geographical location; and
   further comprising a peer mobile handset and wherein said peer mobile handset is adapted to receive a message from said mobile handset in response to said radiation exposure exceeds a threshold.

2. A cellular communication system comprising:
   a cellular network;
   at least one mobile handset in active communication with said cellular network, said mobile handset capable of estimating radiation exposure in a user, generating a radiation report, and automatically prompting the user to perform an action, upon the estimation of radiation exposure exceeding a selected amount the action selected from at least one of: direct the call to a wired or wireless headset, direct the call to a speaker, move the mobile handset a distance from the user, disconnect the call, change orientation of the mobile device with respect to the user, provide a guidance indicator to direct the user to orient the mobile handset towards a cellular base-station the user communicates with, move to a location where the mobile handset will radiate less power, switch to vertical phone posture, switch to horizontal phone posture, use a loudspeaker, and move to the previous or a different geographical location; and
   a monitoring mobile handset to configure and supervise said mobile handset, to receive a message from said mobile handset in response to the radiation exposure exceeds a threshold and to get said radiation report of said mobile handset.

3. A cellular communication system comprising:
   a cellular network;
   at least one mobile handset in active communication with said cellular network, said mobile handset capable of estimating radiation exposure in a user, capable of generating a radiation report, automatically prompting the user to perform an action, upon the estimation of radiation exposure exceeding a selected amount the action selected from at least one of: direct the call to a wired or wireless headset, direct the call to a speaker, move the mobile handset a distance from the user, disconnect the call, change orientation of the mobile device with respect to the user, provide a guidance indicator to direct the user to orient the mobile handset towards a cellular base-station the user communicates with, move to a location where the mobile handset will radiate less power, switch to vertical phone posture, switch to horizontal phone posture, use a loudspeaker, and move to the previous or a different geographical location; and
   further comprising a user PC to configure said mobile handset and to get said radiation report of said mobile handset.

* * * * *